(12) United States Patent
Macias

(10) Patent No.: US 11,584,475 B2
(45) Date of Patent: Feb. 21, 2023

(54) ELECTRIC BICYCLE ASSEMBLY

(71) Applicant: Israel Macias, Westminster, CA (US)

(72) Inventor: Israel Macias, Westminster, CA (US)

(*) Notice: Subject to any disclaimer, the term of this patent is extended or adjusted under 35 U.S.C. 154(b) by 376 days.

(21) Appl. No.: 16/923,722

(22) Filed: Jul. 8, 2020

(65) Prior Publication Data
US 2022/0009587 A1  Jan. 13, 2022

(51) Int. Cl.
| | |
|---|---|
| B62M 6/45 | (2010.01) |
| B62K 23/06 | (2006.01) |
| B62J 43/13 | (2020.01) |
| B62H 1/02 | (2006.01) |
| B62M 9/00 | (2006.01) |
| H02K 7/18 | (2006.01) |
| H02J 7/00 | (2006.01) |
| B62M 6/60 | (2010.01) |

(52) U.S. Cl.
CPC ............ B62M 6/45 (2013.01); B62H 1/02 (2013.01); B62J 43/13 (2020.02); B62K 23/06 (2013.01); B62M 6/60 (2013.01); B62M 9/00 (2013.01); H02J 7/007 (2013.01); H02J 7/0013 (2013.01); H02K 7/1853 (2013.01); B62H 2700/005 (2013.01); H02J 2207/20 (2020.01)

(58) Field of Classification Search
CPC . B62M 9/00; B62M 6/45; B62K 23/06; B62J 43/13; B62H 1/02; B62H 1/04
See application file for complete search history.

(56) References Cited

U.S. PATENT DOCUMENTS

| | | | |
|---|---|---|---|
| 3,921,745 A | 11/1975 | McCulloch | |
| 5,489,002 A * | 2/1996 | Streiff | B60L 8/003 |
| | | | 280/214 |
| D434,349 S | 11/2000 | Currie | |
| 6,260,649 B1 | 7/2001 | Carney, Jr. | |
| 6,717,280 B1 | 4/2004 | Bienville | |
| 6,987,327 B1 * | 1/2006 | Lucatero | B62J 6/08 |
| | | | 74/625 |
| 9,061,731 B1 * | 6/2015 | Do | B62M 6/85 |
| 10,377,435 B2 * | 8/2019 | Montague | B62H 1/04 |
| 2002/0147079 A1 | 10/2002 | Kalnbach | |

FOREIGN PATENT DOCUMENTS

| | | | |
|---|---|---|---|
| WO | WO2010066511 | 6/2010 | |
| WO | WO-2012080506 A1 * | 6/2012 | B62H 1/04 |

* cited by examiner

*Primary Examiner* — Jacob B Meyer
*Assistant Examiner* — Hosam Shabara

(57) ABSTRACT

An electric bicycle assembly for propelling a bicycle includes a bicycle that includes a first chain sprocket and pedals coupled to the first chain sprocket for rotating the first chain sprocket to propel the bicycle. A second chain sprocket is coupled to the first chain sprocket such that the second chain sprocket is rotated when the first chain sprocket is rotated. A generator is coupled to the bicycle and the generator is rotated to generate electrical energy when the pedals are pedaled. A motor is coupled to the bicycle and the motor is in mechanical communication with the rear wheel. The motor rotates the rear wheel when the motor is turned on for propelling the bicycle.

8 Claims, 4 Drawing Sheets

ELECTRIC BICYCLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bicycle devices and more particularly pertains to a new bicycle device for propelling a bicycle.

(2) Description of Related Art Including Information Disclosed Under 37 CFR 1.97 and 1.98

The prior art relates to bicycle devices including a powered bicycle that includes a motor and a power supply. The prior art discloses a powered bicycle that each includes a generator/motor that acts as a motor at high voltage and a generator at low voltage. The prior art discloses a variety of stationary bicycles that is each mechanically coupled to a generator for producing electrical energy. The prior art further discloses a stationary bicycle that includes a generator for producing electrical energy for household appliances.

BRIEF SUMMARY OF THE INVENTION

An embodiment of the disclosure meets the needs presented above by generally comprising a bicycle that includes a first chain sprocket and pedals coupled to the first chain sprocket for rotating the first chain sprocket to propel the bicycle. A second chain sprocket is coupled to the first chain sprocket such that the second chain sprocket is rotated when the first chain sprocket is rotated. A generator is coupled to the bicycle and the generator is rotated to generate electrical energy when the pedals are pedaled. A motor is coupled to the bicycle and the motor is in mechanical communication with the rear wheel. The motor rotates the rear wheel when the motor is turned on for propelling the bicycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
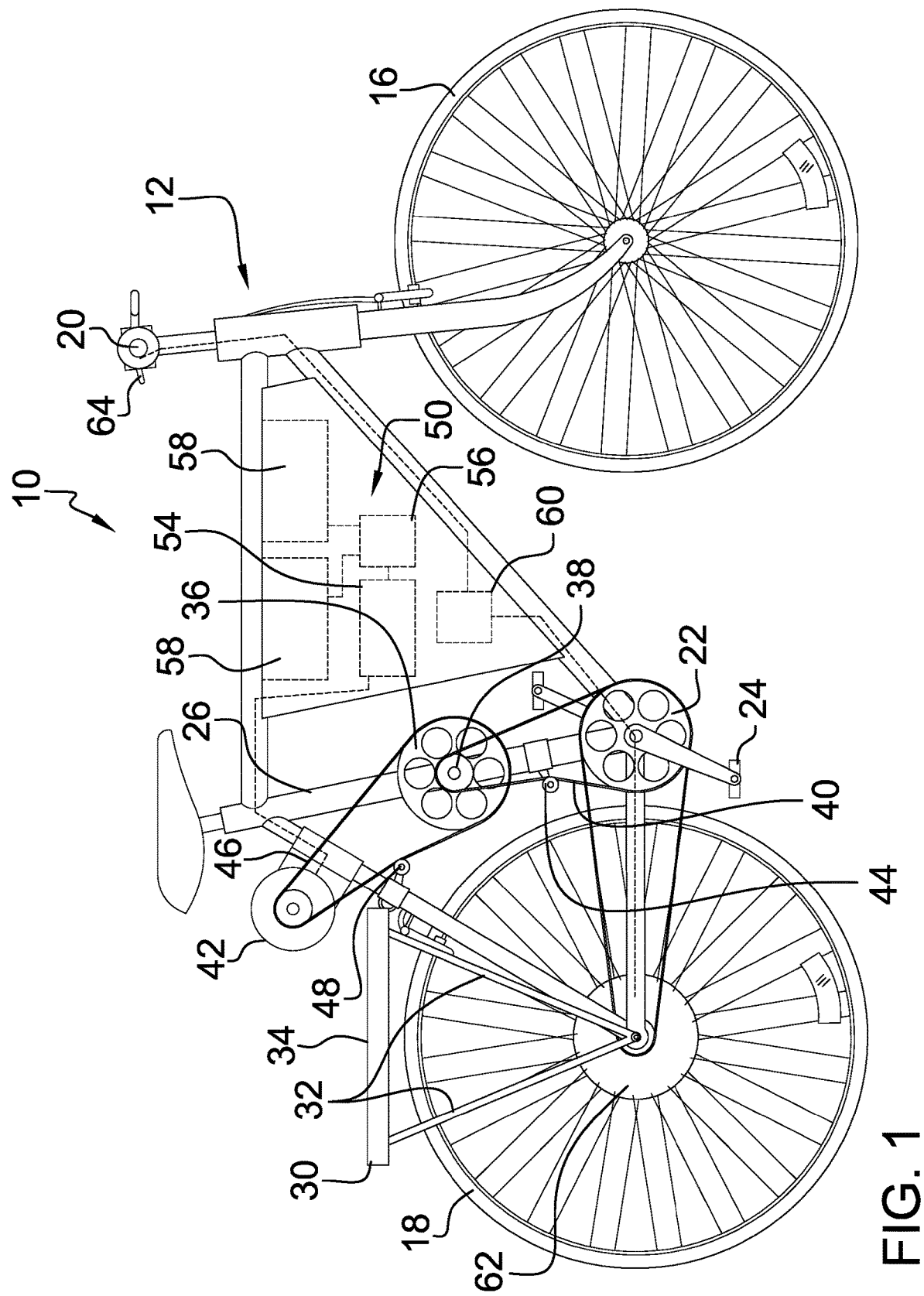
FIG. 1 is a right side phantom view of an electric bicycle assembly according to an embodiment of the disclosure.
Figure 2:
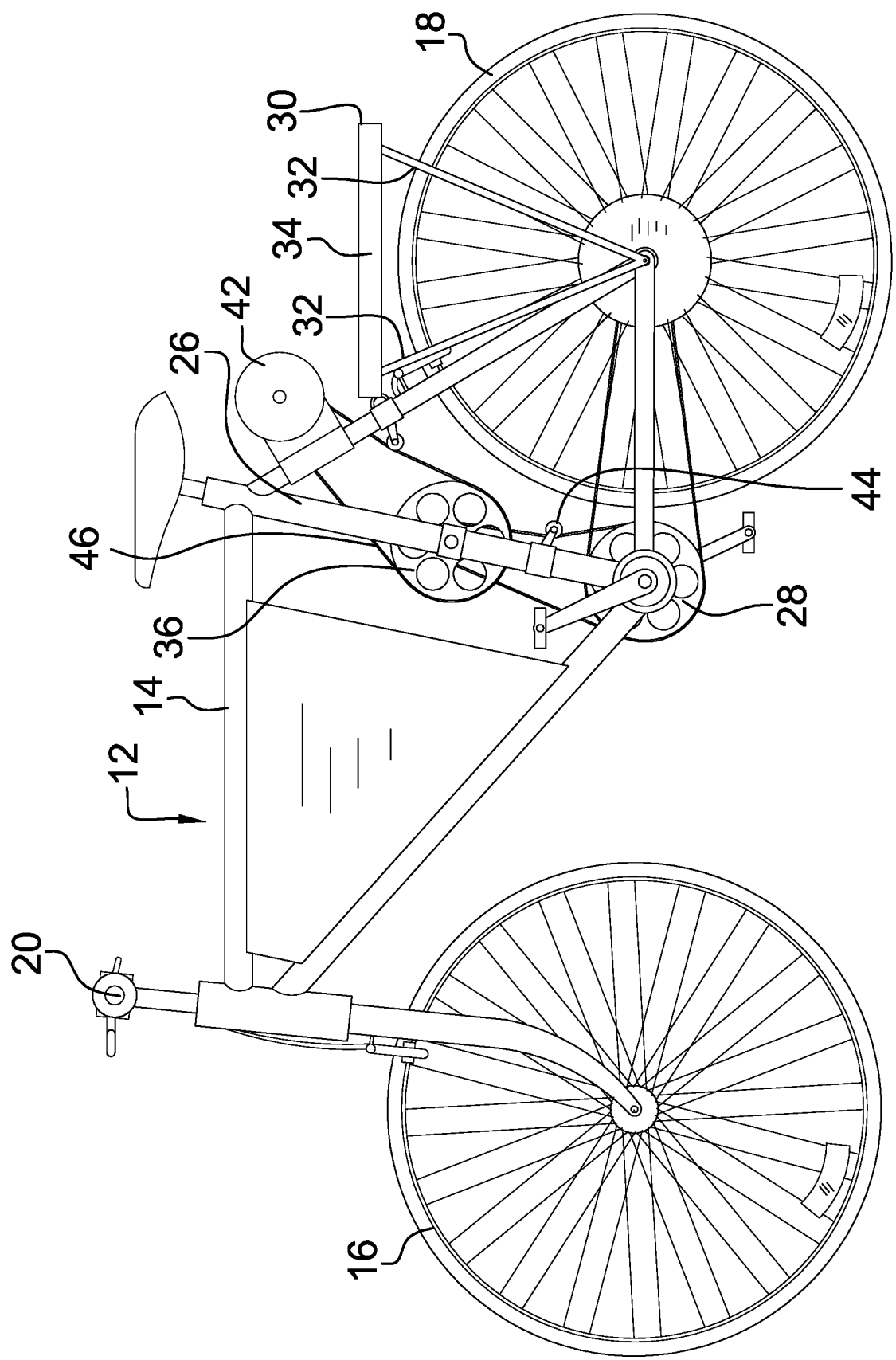
FIG. 2 is a left side view of an embodiment of the disclosure.
Figure 3:
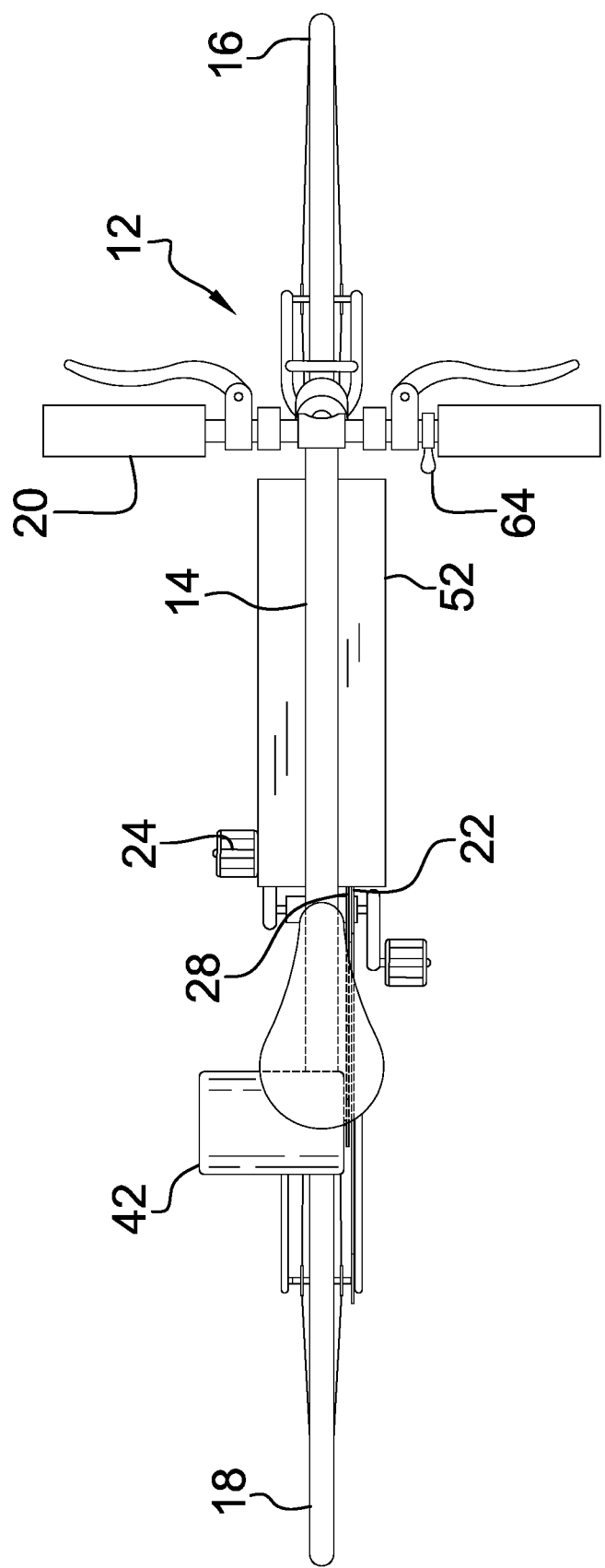
FIG. 3 is a top phantom view of an embodiment of the disclosure.
Figure 4:
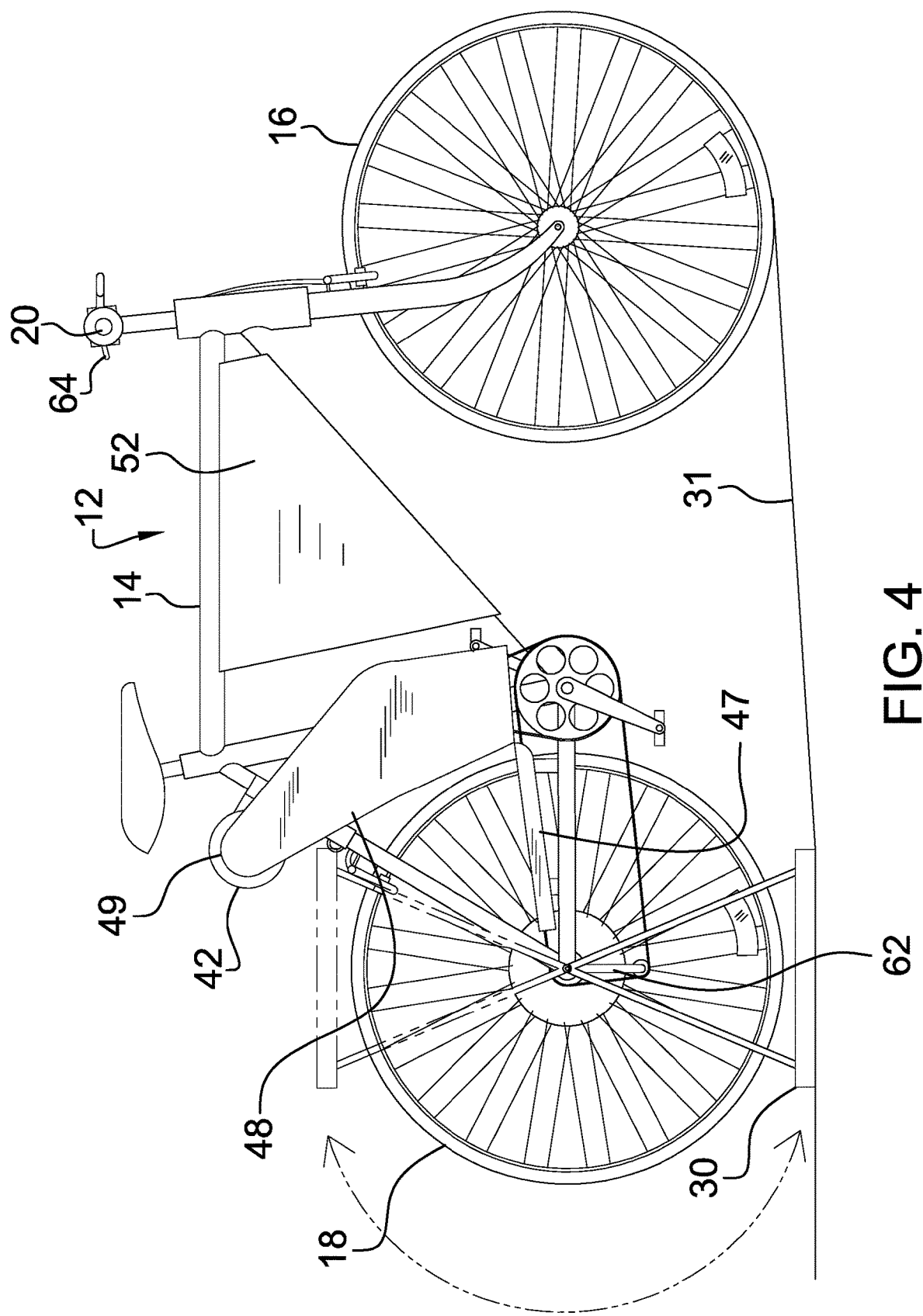
FIG. 4 is a perspective in-use view of an embodiment of the disclosure showing a stand in a deployed position.

With reference now to the drawings, and in particular to FIGS. 1 through 4 thereof, a new bicycle device embodying the principles and concepts of an embodiment of the disclosure and generally designated by the reference numeral 10 will be described.

As best illustrated in FIGS. 1 through 4, the electric bicycle assembly 10 generally comprises a bicycle 12 that includes a frame 14, a front wheel 16, a rear wheel 18, handle bars 20, a first chain sprocket 22 and pedals 24 coupled to the first chain sprocket 22. The pedals 24 rotate the first chain sprocket 22 for propelling the bicycle 12 in the convention of traditional bicycles and the frame 14 includes a seat post 26. A second chain sprocket 28 is coupled to the first chain sprocket 22 such that the second chain sprocket 28 is rotated when the first chain sprocket 22 is rotated. Additionally, each of the first chain sprocket 22 and the second chain sprocket 28 share a rotational axis.

A stand 30 is provided and the stand 30 is pivotally coupled to the bicycle 12. The stand 30 is positionable in a deployed position for lifting the rear wheel 18 upwardly from a support surface 31. In this way the bicycle 12 remains stationary when the pedals 24 are pedaled. Conversely, the stand 30 is positionable in a stored position for lowering the rear wheel 18 onto the support surface 31. In this way the bicycle 12 is propelled along the support surface 31 when the pedals 24 are pedaled. The stand 30 may comprise a plurality of supports 32, each being pivotally coupled to opposite sides of the rear wheel 18 and a platform 34 extending between the supports 32. The platform 34 may be positioned above the rear wheel 18 when the stand 30 is in the stored position and the platform 34 may rest on the support surface 31 when the stand 30 is in the deployed position.

A drive sprocket 36 is rotatably coupled to the bicycle 12 and the drive sprocket 36 is positioned on the seat post 26.

A drive gear 38 is provided and the drive gear 38 is coupled to the drive sprocket 36. Additionally, the drive gear 38 and the drive sprocket 36 share a rotational axis. A drive chain 40 extends around the second chain sprocket 28 and the drive gear 38 such that the drive sprocket 36 is rotated when the second chain sprocket 28 is rotated. A generator 42 is coupled to the bicycle 12 and the generator 42 is in mechanical communication with the second chain sprocket 28. In this way the generator 42 is rotated when the second chain sprocket 28 is rotated to generate electrical energy. A drive chain tensioner 44 is coupled to the frame 14 of the bicycle 12 and the drive chain tensioner 44 engages the drive chain 40 for adjusting tension of the drive chain 40.

The generator 42 is coupled to the frame 14 of the bicycle 12 and the generator 42 includes a gear 45 that is coupled thereto for spinning the generator 42. Moreover, the generator 42 produces alternating current electrical energy. The generator 42 may be a permanent magnet generator or other similar type of generator 42. A generator chain 46 extends around the drive sprocket 36 and the gear 45 on the generator 42 such that the generator 42 is rotated when the second chain sprocket 28 is rotated. A generator chain tensioner 48 is coupled to the frame 14 of the bicycle 12 and the generator chain tensioner 48 engages the generator chain 46 for adjusting tension of the generator chain 46. As is most clearly shown in FIG. 4, a first chain guard 47 is coupled to the bicycle and the first chain guard 47 extends from the first chain sprocket 22 toward the rear wheel 18. As is most clearly shown in FIG. 4, a second chain guard 49 is coupled to the bicycle 12 and the second chain guard 49 extends between the first chain sprocket 22 and the generator 42. The second chain guard 49 covers the drive chain 40, the drive chain tensioner 44, the drive sprocket 36, the generator chain 46, and the generator chain tensioner 48.

A charge unit 50 is coupled to the bicycle 12 and the charge unit 50 is in electrical communication with the generator 42. In this way the charge unit 50 receives, and subsequently conditions, the electrical energy generated by the generator 42. A housing 52 is provided, the housing 52 is coupled to the frame 14 of the bicycle 12 and the charge unit 50 is positioned in the housing 52. The charge unit 50 comprises a charge regulator 54 that is electrically coupled to the generator 42. The charge regulator 54 receives the electrical energy from the generator 42 to modulate the electrical energy. The charge unit 50 includes a rectifier 56 that is electrically coupled to the charge regulator 54 and the rectifier 56 converts the alternating current produced by the generator 42 into direct current. Each of the charge regulator 54 and the rectifier 56 may be solid state electronic devices that are common to voltage regulating systems which are commonly employed with generator systems.

The charge unit 50 includes a plurality of batteries 58 and each of the batteries 58 is electrically coupled to the rectifier 56 for charging the batteries 58 with direct current. The charge unit 50 further includes a speed controller 60 that is electrically coupled to the plurality of batteries 58. The speed controller 60 may be a solid state electronic device that is capable of adjusting the current and voltage delivered from the speed controller 60. Additionally, each of the batteries 58 may be dry cell batteries, lithium ion batteries, lead acid batteries or any other type of battery commonly employed for storing electrical energy produced by a generator.

A motor 62 is provided and the motor 62 is coupled to the bicycle 12. The motor 62 is in mechanical communication with the rear wheel 18 and the motor 62 rotates the rear wheel 18 when the motor 62 is turned on. In this way the motor 62 can propel the bicycle 12. The motor 62 is in electrical communication with the charge unit 50 for receiving electrical current from the charge unit 50. Additionally, the motor 62 is electrically coupled to the speed controller 60. The motor 62 may comprise an electric motor that has a power output sufficient to propel the bicycle 12 and the rider at speeds ranging between approximately 5.0 mph and 20.0 mph.

A throttle 64 is movably coupled to the handle bars 20 such that the throttle 64 is accessible to a rider. The throttle 64 is in electrical communication with the charge unit 50 for modulating voltage and current delivered to the motor 62 to adjust the velocity of the bicycle 12. The throttle 64 is electrically coupled to the speed controller 60. Moreover, the throttle 64 adjusts an output of the speed controller 60 between a minimum output and a maximum output thereby adjusting rotational speed of the motor 62.

In use, the pedals 24 are pedaled to propel the bicycle 12 while simultaneously turning the generator 42 to produce electrical energy for charging the plurality of batteries 58. In this way the bicycle 12 can be ridden while the plurality of batteries 58 is charged. Additionally, the stand 30 can be positioned in the deployed position thereby facilitating the bicycle 12 to remain stationary when the pedals 24 are pedaled. In this way the all of the energy from the pedals 24 being pedaled is employed for charging the plurality of batteries 58. The throttle 64 can be manipulated to propel the bicycle 12 with the motor 62 rather than with the pedals 24. Moreover, the pedals 24 can be pedaled while the motor 62 is turned on for reducing energy consumption of the motor 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electric bicycle assembly including a secondary gear and chain for rotating a generator to charge a battery, said electric bicycle assembly comprising:

a bicycle including a first chain sprocket and pedals being coupled to said first chain sprocket for rotating said first chain sprocket to propel said bicycle;

a second chain sprocket being coupled to said first chain sprocket such that said second chain sprocket is rotated when said first chain sprocket is rotated;

a generator being coupled to said bicycle, said generator being in mechanical communication with said second chain sprocket such that said generator is rotated when said second chain sprocket is rotated wherein said generator is configured to generate electrical energy;
a charge unit being coupled to said bicycle, said charge unit being in electrical communication with said generator wherein said charge unit is configured to receive the electrical energy generated by said generator;
a motor being coupled to said bicycle, said motor being in mechanical communication with a rear wheel, said motor rotating said rear wheel when said motor is turned on for propelling said bicycle, said motor being in electrical communication with said charge unit for receiving electrical current from said charge unit;
a throttle being movably coupled to handle bars wherein said throttle is configured to be accessible to a rider, said throttle being in electrical communication with said charge unit for modulating voltage and current delivered to said motor wherein said throttle is configured to adjust the velocity of said bicycle; and
wherein said charge unit comprises:
  a charge regulator being electrically coupled to said generator such that said charge regular receives the electrical energy from said generator wherein said charge regular is configured to modulate the electrical energy;
  a rectifier being electrically coupled to said charge regulator, said rectifier converting the alternating current produced by said generator into direct current;
  a plurality of batteries, each of said batteries being electrically coupled to said rectifier for charging said batteries with direct current; and
  a speed controller being electrically coupled to said plurality of batteries.

2. The electric bicycle assembly according to claim 1, further comprising a stand being pivotally coupled to said bicycle, said stand being positionable in a deployed position for lifting said rear wheel upwardly from a support surface wherein said bicycle is configured to remain stationary when said pedals are pedaled, said stand being positionable in a stored position for lowering said rear wheel onto the support surface wherein said bicycle is configured to be propelled along the support surface.

3. The electric bicycle assembly according to claim 1, further comprising a drive sprocket being rotatably coupled to said bicycle, said drive sprocket being positioned on said seat post.

4. The electric bicycle assembly according to claim 3, further comprising:
  a drive gear being coupled to said drive sprocket; and
  a drive chain extending around said second chain sprocket and said drive gear such that said drive sprocket is rotated when said second chain sprocket is rotated.

5. An electric bicycle assembly including a secondary gear and chain for rotating a generator to charge a battery, said electric bicycle assembly comprising:
  a bicycle including a first chain sprocket and pedals being coupled to said first chain sprocket for rotating said first chain sprocket to propel said bicycle;
  a second chain sprocket being coupled to said first chain sprocket such that said second chain sprocket is rotated when said first chain sprocket is rotated;
  a generator being coupled to said bicycle, said generator being in mechanical communication with said second chain sprocket such that said generator is rotated when said second chain sprocket is rotated wherein said generator is configured to generate electrical energy;
  a charge unit being coupled to said bicycle, said charge unit being in electrical communication with said generator wherein said charge unit is configured to receive the electrical energy generated by said generator;
  a motor being coupled to said bicycle, said motor being in mechanical communication with a rear wheel, said motor rotating said rear wheel when said motor is turned on for propelling said bicycle, said motor being in electrical communication with said charge unit for receiving electrical current from said charge unit;
  a throttle being movably coupled to handle bars wherein said throttle is configured to be accessible to a rider, said throttle being in electrical communication with said charge unit for modulating voltage and current delivered to said motor wherein said throttle is configured to adjust the velocity of said bicycle;
  a drive sprocket being rotatably coupled to said bicycle, said drive sprocket being positioned on said seat post;
  a drive gear being coupled to said drive sprocket;
  a drive chain extending around said second chain sprocket and said drive gear such that said drive sprocket is rotated when said second chain sprocket is rotated;
  wherein said generator is coupled to said frame of said bicycle, said generator including a gear being coupled thereto for spinning said generator, said generator producing alternating current electrical energy; and
  wherein said assembly includes a generator chain extending around said drive sprocket and said gear on said generator such that said generator is rotated when said second chain sprocket is rotated.

6. The electric bicycle assembly according to claim 1, wherein said motor is electrically coupled to said speed controller.

7. The electric bicycle assembly according to claim 6, further comprising said throttle is electrically coupled to said speed controller, said throttle adjusting an output of said speed controller between a minimum output and a maximum output thereby adjusting rotational speed of said motor.

8. An electric bicycle assembly including a secondary gear and chain for rotating a generator to charge a battery, said electric bicycle assembly comprising:
  a bicycle including a frame, a front wheel, a rear wheel, handle bars, a first chain sprocket and pedals coupled to said first chain sprocket for rotating said first chain sprocket for propelling said bicycle, said frame including a seat post;
  a second chain sprocket being coupled to said first chain sprocket such that said second chain sprocket is rotated when said first chain sprocket is rotated;
  a stand being pivotally coupled to said bicycle, said stand being positionable in a deployed position for lifting said rear wheel upwardly from a support surface wherein said bicycle is configured to remain stationary when said pedals are pedaled, said stand being positionable in a stored position for lowering said rear wheel onto the support surface wherein said bicycle is configured to be propelled along the support surface;
  a drive sprocket being rotatably coupled to said bicycle, said drive sprocket being positioned on said seat post;
  a drive gear being coupled to said drive sprocket;
  a drive chain extending around said second chain sprocket and said drive gear such that said drive sprocket is rotated when said second chain sprocket is rotated;
  a generator being coupled to said bicycle, said generator being in mechanical communication with said second chain sprocket such that said generator is rotated when said second chain sprocket is rotated wherein said generator is configured to generate electrical energy, said generator being coupled to said frame of said bicycle, said generator including a gear being coupled thereto for spinning said generator, said generator producing alternating current electrical energy;

a generator chain extending around said drive sprocket and said gear on said generator such that said generator is rotated when said second chain sprocket is rotated;

a charge unit being coupled to said bicycle, said charge unit being in electrical communication with said generator wherein said charge unit is configured to receive the electrical energy generated by said generator, said charge unit comprising:

a charge regulator being electrically coupled to said generator such that said charge regular receives the electrical energy from said generator wherein said charge regular is configured to modulate the electrical energy;

a rectifier being electrically coupled to said charge regulator, said rectifier converting the alternating current produced by said generator into direct current;

a plurality of batteries, each of said batteries being electrically coupled to said rectifier for charging said batteries with direct current; and a speed controller being electrically coupled to said plurality of batteries;

a motor being coupled to said bicycle, said motor being in mechanical communication with said rear wheel, said motor rotating said rear wheel when said motor is turned on for propelling said bicycle, said motor being in electrical communication with said charge unit for receiving electrical current from said charge unit, said motor being electrically coupled to said plurality of speed controller; and a throttle being movably coupled to said handle bars wherein said throttle is configured to be accessible to a rider, said throttle being in electrical communication with said charge unit for modulating voltage and current delivered to said motor wherein said throttle is configured to adjust the velocity of said bicycle, said throttle being electrically coupled to said speed controller, said throttle adjusting an output of said speed controller between a minimum output and a maximum output thereby adjusting rotational speed of said motor.

* * * * *